Patented Aug. 23, 1932

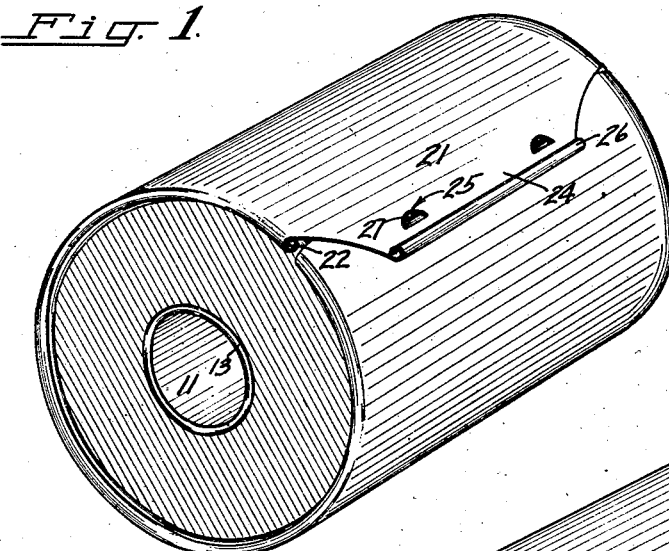
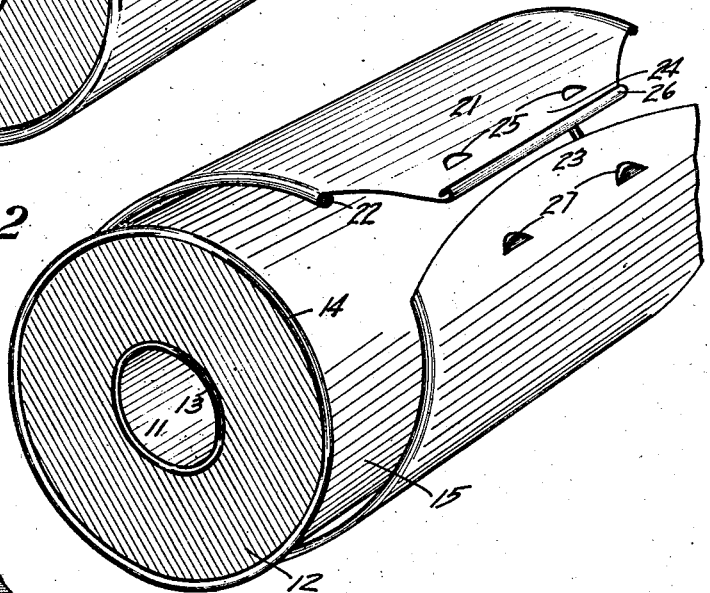
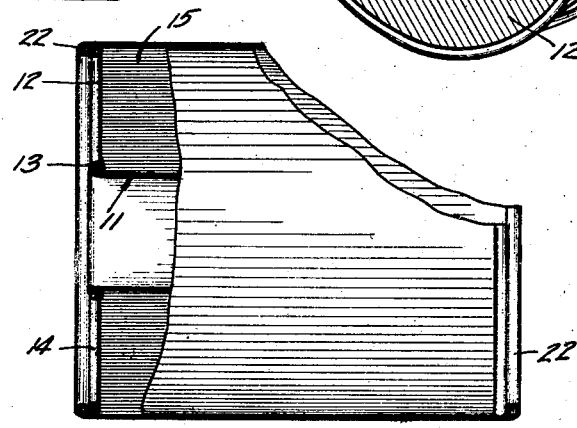

1,873,618

UNITED STATES PATENT OFFICE

GEORGE F. MILLER, OF BROOKLYN, NEW YORK, ASSIGNOR TO AMERICAN CAN COMPANY, OF NEW YORK, N. Y., A CORPORATION OF NEW JERSEY

SPOOL AND PROTECTOR THEREFOR

Application filed January 26, 1931. Serial No. 511,129.

The present invention relates to spools for tape, ribbon and the like and to a protector for enclosing the spool in a unit assembly.

The principal object of the invention is the provision of a spool and protector assembly which is simple to manufacture and one wherein the spool is easily engaged in the protector and locked in protected position.

Numerous other objects of the invention will be apparent as it is better understood from the following description, which, taken in connection with the accompanying drawing, discloses a preferred embodiment thereof.

Referring to the drawing:

Figure 1 is a perspective view of a spool and its protecting shell showing the parts in assembled position;

Fig. 2 is a view similar to Fig. 1 illustrating the spool in partially inserted position within its protecting shell; and Fig. 3 is a fragmentary longitudinal section of the enclosing shell illustrating a spool in protected position, the spool being shown partially in section.

The spool may comprise a tubular core 11 which is preferably formed from sheet material and has a disc-like head 12 secured to each end of the core in a fixed joint such as one provided by interfolding the edges of core and head in a double seam 13. The outer edge of the head 12 is preferably bent over to form an open curl 14. This spool may contain adhesive tape 15 or any other suitable material wound on the core 11 in the usual manner.

A protector shell is provided which comprises an open cylindrical member 21 having its parallel end edges bent or spun inwardly to form curls 22, the length of the shell being of a dimension exceeding the length of the spool. Side edges of the cylindrical member 21, designated respectively by the numerals 23 and 24 normally spread or spring apart sufficiently (Fig. 2) to permit insertion of the spool longitudinally of the shell. These edges 23 and 24 can then be closely wrapped together by an overlapping of the edge 24 on the outside of the edge 23 and in such overlapped position the shell completely encloses the spool. As illustrated in Fig. 3, the curls 22 when the shell is in this closed position, lie closely adjacent the curls 14 of the spool and closely confine the spool within the shell preventing longitudinal movement thereof.

Provision is made for locking the side edges 23 and 24 in overlapped position. This locking feature comprises spaced openings 25 struck out in the side part 24 and its outer edge is bent upwardly and over to form a curl 26. The openings 25 coact with spaced projections 27 struck out from the side part 23, as illustrated in Fig. 1. Cooperation between the struck out projections 27 and the openings 25 hold the cylindrical wall of the shell in tight registry with the outer wall of the spool heads, the curls 22 of the shell rigidly holding against the curls 14 of the spool, as illustrated.

When it is desirable to gain access to the spool, the shell may be opened by a prying out of the overlapped side part 24 by slight pressure applied under the curled edge 26 and this unsnaps or releases the openings 25 from the projections 27. The natural spring in the metal of the member 21 returns the shell into its open position, illustrated in Fig. 2, at which time the spool with its tape may be readily extracted by withdrawing along a longitudinal axis of the shell.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

The combination of a spool having heads and a core connecting said heads, and an enclosing and protecting divided metallic shell having cooperating snap-catch elements, struck from the divided ends of said shell, the edges of the shell being rigidly supported by said heads, the catch elements being releasable by prying up the exposed end of the shell.

GEORGE F. MILLER.